2,865,814

METHOD OF MAKING CAROTENES AND RELATED SUBSTANCES BY MIXED CULTURE FERMENTATION

Clifford W. Hesseltine and Ralph F. Anderson, Peoria, Ill., assignors to the United States of America as represented by the Secretary of Agriculture No Drawing. Application February 18, 1957 Serial No. 640,991

9 Claims. (Cl. 195—78)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of food and feed materials containing carotenes, carotenoids and related products and a process for combining two cultures of fungi to bring about enhanced yields of the above products.

This invention concerns the production of beta-carotene (pro-vitamin A) and related carotenoids by microbiological processes. Heretofore production of carotenoid compounds of commercial utility has been by chemical synthesis or by extraction from natural plant sources. Certain green, leafy crops contain relatively large amounts of carotenoids and are dried and added to animal rations to supply vitamin A activity, and, especially for poultry, pigmentation enhancing factors. Extracted or synthetic beta-carotene also is useful in imparting color ranging from yellow to red to foodstuffs, especially those of high fat or oil content. Vitamin A, which arises from beta-carotene and certain related compounds, is essential for optimum human visual function. Lack of the vitamin causes general debility in man and animals.

Each of the species of fungi belonging to the order Mucorales can be divided into two groups based upon their sexual reaction. Thus strains exist of opposite mating types which are similar to male and female sexes in higher animals. When a male (plus) strain and a female (minus) strain of the same species are placed together under appropriate conditions of temperature, nutrients, moisture, etc., the two strains react mutually to produce sexual organs which in turn unite to produce a sexual body called the zygospore. This sexually produced spore will germinate under appropriate conditions to give rise to plus and minus strains. When sexual reproductive organs are formed there are sometimes small amounts of carotenoid pigments produced. This invention makes use of the above facts to enhance the production of the pigments which have been found to be in part beta-carotene. Thus, we have discovered that by placing the strains under certain abnormal conditions for growth in a liquid medium and by using certain combinations of nutrients and by mixing opposite mating types of different genera and species, we have increased the yield of carotenoids many times.

The fungi used in this invention belong to the class Phycomycetes and the order Mucorales. The classification is based upon that of H. Zycha, "Mucorineae" in Kryptogamenflora der Mark Brandenburg, volume 6a, 1935. Of particular value are organisms designated from the genera Mucor, Blakeslea, Choanephora, Phycomyces, Pilaira and Parasitella, such as *Mucor hiemalis, Blakeslea trispora, Blakeslea circinans, Choanephora conjuncta, Choanephora cucurbitarum, Phycomyces blakesleeanus, Pilaira anomala* and *Parasitella simplex.* Other fungi from the order Mucorales may be selected for conducting the process of this invention by the procedures which are described in detail below. Many of these fungi are available in public culture collections, and others may be isolated from the air, soil, decaying plants and other natural materials by standard procedures well known to mycologists.

In order to carry out this novel synthesis of carotenoids, strains of mucoraceous fungi, such as *Blakeslea trispora,* must be obtained. Strains NRRL 2456 and 2457 of *Blakeslea trispora* are available from the Culture Collection at the Northern Utilization Research Branch, Peoria, Illinois. Isolates of the mold must be tested under appropriate culture conditions such as temperatures of 20° C. to 30° C. using potato-dextrose agar to determine whether or not they are sexually active, hence of opposite mating types. This is accomplished by inoculating each strain on appropriate nutrient agar in the same Petri dish. If they are of the same mating type, colonies will grow over the plate and meet but nothing further will occur. However, if they are of opposite mating types, the colonies will meet and typical sexually-produced cells, zygospores, will be formed in less than a week. Once strains have been mated and their mating reaction has been identified, they may be used in the fermentation process described below for manufacture of carotenoids and related materials. The first step is to prepare liquid media suitable for the growth of the mucoraceous molds. The media must include thiamine and other vitamins, carbohydrates, nitrogen, such as in asparagine, and mineral salts. Carbohydrates may be supplied as glucose or sucrose, or in the form of unpurified carbohydrates such as those found in potatoes. The nitrogen sources may be amino acids, such as asparagine, or protein and amino acids as found in natural products such as potatoes. Various other carbohydrate and nitrogen sources may be used besides those mentioned above. The amounts of carbohydrates may vary from 0.1 percent to 20 percent. The pH of the medium will be 5.0 to 6.5 and need not be adjusted. The liquid medium is heat sterilized by autoclaving and the flasks or fermentors are inoculated. Inoculum may consist of mycelial fragments taken from agar slants or from Petri dishes, or spores, or both, or mycelium grown in liquid media. Inoculum is prepared by growing the appropriate mating types upon appropriate nutrient agar such as potato-dextrose agar or malt agar. As mentioned above, either spores or mycelium, or both, are inoculated into the cooled liquid medium. Equal amounts of inoculum from each mating type are added to the flask or the fermentor at the same time. The inoculated flasks are placed on a rotary shaker and agitated for proper aeration. The aerobic fermentation is allowed to continue until maximum quantities of mycelium and/or maximum carotenoid production have been attained. A rough estimate of the carotenoids may be determined visually by observing the intensity of the yellow-orange pigments present in the mycelium of the fungus.

This fermentation is conducted at about 28° C. and, in general, approximately three to five days are required to obtain good yields. The fermentation, of course, is influenced by size of inoculum, available nutrients, temperature and various other factors. It is understood that conditions for obtaining the best yields vary somewhat with the particular strains of the organisms employed.

At the end of the fermentation the mycelium and other solids are removed by filtration. The carotenoids are present chiefly in the mycelium thus produced.

The beta-carotene content of the fermentation product may be determined spectrophotometrically after suitable chromatographic separations according to the procedure detailed in the 6th edition of Methods of Analysis of the Association of Official Agricultural Chemists, 1945.

The molds used in the above process may be plus and minus strains of the same species. We have also found that opposite mating types of different species are equally good in the process. For example, a strain of *Blakeslea trispora* with a plus reaction may be combined with a strain having a minus reaction of a second species, *Blakeslea circinans*, in appropriate liquid media and increased yields of carotenoids will be obtained. It has been found highly profitable for the fermentation to combine opposite mating types from two different genera. Thus, a plus strain of *Choanephora conjuncta* may be used in the same fermentation with a minus strain of *Blakeslea trispora* and marked increases in yields of carotenoids occur.

The combining of opposite mating reaction types does not involve hybridization. In hybridization the improved organism develops from a cell resulting from the fusion of the sex cells from each parent. In this invention plus and minus strains of the molds come into contact and the carotenoids are produced prior to actual sexual reproduction. The organism developing from the mating is of no importance. Chemically defined media do not allow zygospores to form, but are quite satisfactory for the production of carotenoids. Such media support good vegetative growth and the mutual stimulation of carotenoid production in both the minus and plus strains but suppress mating to zygospore formation. However, the formation of the zygospores does not appear to influence the high yields of carotenoids for the same mutual simulation of carotenoids can be observed when a potato-dextrose medium is used in which zygospores are formed.

The following examples are given by way of illustration and are not intended as a limitation of this invention. Indeed, many widely different embodiments of the present invention may be made without departing from the spirit and scope hereof, it is to be understood that the invention is only limited as defined in the appended claims.

EXAMPLE 1

A series of 500 mil. Erlenmeyer flasks each containing 100 ml. of sterile medium composed of 40 grams of glucose, 2 grams of asparagine, 0.5 gram of $KH_2PO_4$, 0.5 gram of $MgSO_4$, 0.5 milligrams thiamine and 1 liter of distilled water were sterilized by autoclaving at 15 pounds' pressure for 15 minutes. The pH was not adjusted. One set of flasks was inoculated in triplicate with either spores or fragments of living mycelium of either a plus or minus strain of the fungus *Blakeslea trispora* (NRRL 2456 (+) and 2457 (−)) alone, and a second set of flasks was inoculated with living mycelium or spores of both a plus strain of *Blakeslea trispora* NRRL 2456 and a minus strain of the same species, NRRL 2457 (−). The inoculum was approximately equal in quantity whether one or two strains were used in the flask. In both sets, the strain or strains used were grown separately on nutrient agar slants for inoculum. After appropriate inoculation of the flasks in the two sets above, the said flasks were placed on a rotary shaker for agitation and incubated for 72 hours at approximately 28° C. At the end of this submerged fermentation, each strain grown singly resulted in masses of light-colored mycelium. However, in the flasks in which both plus and minus strains had been incubated, the mycelium of the two cultures had combined into large masses which were bright yellow-orange.

The results with *Blakeslea trispora* are summarized in Table 1.

*Table 1*

| Strain and mating reaction | Mycelium dry weight, g./300 ml. | beta-carotene | |
|---|---|---|---|
| | | Total µg. in 300 ml. | µg./g. |
| NRRL 2456 (+) | 0.73 | 160 | 220 |
| NRRL 2457 (−) | 0.58 | 90 | 155 |
| NRRL 2456 (+) X NRRL 2457 (−) | 0.67 | 368 | 550 |

The (+) and (−) symbols refer to the mating reactions of the culture. Thus, when a (+) and a (−) strain are placed together upon appropriate nutrient agar, sexual spores result. In the above example, no zygospores are formed but rather there is a marked increase in the carotene content as far as the total amount per flask and also units per gram of dry mycelium are concerned.

EXAMPLE 2

A similar series of flasks were prepared using the same medium, incubation time, amount of medium, temperature and agitation as in Example 1. However, the organisms used were plus and minus strains of *Choanephora cucurbitarium* (NRRL A–6097 (+) and NRRL A–6098 (−)). The same gross appearance of the combined strains were observed as in Example 1. The results are summarized in Table 2.

*Table 2*

| Strain and mating reaction | Mycelium dry weight, g./300 ml. | beta-carotene | |
|---|---|---|---|
| | | Total µg. in 300 ml. | µg./g. |
| NRRL A-6097 (+) | 1.09 | 60 | 55 |
| NRRL A-6098 (−) | 1.13 | 52 | 50 |
| NRRL A-6097 (+) X NRRL A-6098 (−) | 1.29 | 200 | 155 |

This example also indicates that in other genera of the Mucorales the same enhanced yields of beta-carotene may be secured by culturing opposite mating types together in liquid media. However, in both *Blakeslea trispora* and *Choanephora cucurbitarum*, zygospores were formed. They did not occur in Example 1.

EXAMPLE 3

This example shows that the effect of growing opposite mating types in liquid media is exerted when an undefined medium composed of naturally occurring carbohydrate and organic nitrogen substances is used. A series of fermentations was conducted under identical conditions of agitation, time, temperature, amount of medium and inoculum as in Example 1. The medium was prepared in the following manner. Two hundred grams of peeled potatoes were placed in 500 milliliters of tap water and cooked. The solids were filtered off and the potato extract added to 500 milliliters of previously dissolved supplements as follows: 0.2 gram of $MgSO_4$, 0.2 gram of $CaCO_3$ and 15–20 grams of glucose. The volume was then made up to 1 liter. The pH was not adjusted. When this series of flasks was inoculated with (+) and (−) strains of *Blakeslea trispora, Blakeslea circinans, Choanephora cucurbitarum* and *Choanephora conjuncta*, the following results were obtained as summarized in Table 3.

*Table 3*

| Species | Strain number and mating reaction | Mycelium dry weight, g./300 ml. | beta-carotene | |
|---|---|---|---|---|
| | | | Total µg. in 300 ml. | µg./g. |
| *Blakeslea trispora* | NRRL 2456 (+) X<br>NRRL 2457 (−) | 1.21 | 700 | 580 |
| *Blakeslea circinans* | NRRL 2546 (+) X<br>NRRL 2548 (−) | 1.15 | 286 | 250 |
| *Choanephora cucurbitarum* | NRRL A-6097 (+) X<br>NRRL A-6098 (−) | 1.25 | 395 | 320 |
| *Choanephora conjuncta* | NRRL 2560 (+) X<br>NRRL 2561 (−) | 0.99 | 143 | 145 |

EXAMPLE 4

This example illustrates that growing opposite mating types of different species will also result in enhanced yields of beta-carotene. The same conditions as to time, agitation, temperature, volume of medium, amount of inoculum were used as described above in Example 1. The medium used was the synthetic one described in Example 1. The results of this interspecific mating using *Blakeslea trispora* NRRL 2457 (−), *Choanephora conjuncta* NRRL 2560 (+), *Choanephora cucurbitarum* NRRL A-6097 (+) and *Choanephora conjuncta* NRRL 2562 (−) are shown in Table 4 as are also the yields obtained when single strains are grown alone under the same conditions.

*Table 4*

| Species | Strain number and mating reaction | Mycelium dry weight, g./300 ml. | beta-carotene | |
|---|---|---|---|---|
| | | | Total µg. in 300 ml. | µg./g. |
| *Blakeslea trispora* | NRRL 2457 (−) | 0.58 | 90 | 155 |
| *Choanephora conjuncta* | NRRL 2560 (+) | 0.71 | 18 | 25 |
| *B. trispora* and *C. conjuncta* | NRRL 2457 (−) X<br>NRRL 2560 (+) | 0.73 | 212 | 290 |
| *Blakeslea trispora* | NRRL 2457 (−) | 0.58 | 90 | 155 |
| *Choanephora cucurbitarum* | NRRL A-6097 (+) | 1.09 | 60 | 55 |
| *B. trispora* X *C. cucurbitarum* | NRRL 2457 (−) X<br>NRRL A-6097 (+) | 1.16 | 215 | 185 |
| *Choanephora conjuncta* | NRRL 2562 (−) | ---- | ---- | ---- |
| *Choanephora cucurbitarum* | NRRL A-6097 (+) | 1.09 | 60 | 20 |
| *Choanephora conjuncta* and *Choanephora cucurbitarum.* | NRRL 2562 (−) X<br>NRRL A-6097 (+) | 0.95 | 265 | 280 |

Table 4 shows that if opposite mating types from two different genera of the Mucorales are allowed to grow under appropriate conditions in liquid media, the yields of beta-carotene are substantially increased over those produced by an equal amount of mycelium from either of the uncombined cultures grown alone. Likewise, when mating types from different species of the same genus are combined, correspondingly large increases of beta-carotene are formed.

We claim:

1. A method for producing carotenoids which comprises cultivating + and − mating type strains of organisms of two different species of the genus Choanephora together in an aqueous nitrient medium comprising an assimilable fermentable carbohydrate source, an assimilable nitrogen source, a source of thiamin, essential mineral salts, and incubating the combined cultures under submerged aerobic conditions, the initial pH of the fermentation being in the range 5.0 to 6.5 and the temperature between 20° and 30° C.

2. The process of claim 1 in which the organisms used are combinations of opposite mating types of *Choanephora conjuncta* and *Choanephora cucurbitarum.*

3. A method for producing carotenoids which comprises cultivating of + and − mating type strains of organisms from the family Choanephoraceae in which the opposite mating types are classified in different genera, together in an aqueous nutrient medium comprising an assimilable fermentable carbohydrate source, an assimilable source of nitrogen, a source of thiamin, essential mineral salts, and incubating the combined cultures under submerged aerobic conditions, the initial pH of the fermentation being in the range 5.0 to 6.5 and the temperature between 20° and 30° C.

4. The process of claim 3 in which the organisms used are opposite mating types of a Choanephora species and a Blakeslea species.

5. The process of claim 3 in which the organisms used are combinations of opposite mating types of *Choanephora cucurbitarium* and *Blakeslea trispora.*

6. The process of claim 3 in which the organisms used are combinations of opposite mating types of *Blakeslea trispora* and *Choanephora conjuncta.*

7. A method for the production of carotenoids which comprises cultivating the + and − strains of two different species of the genus Blakeslea in an aqueous nutrient medium comprising glucose, an assimilable nitrogen source, a source of thiamin, essential mineral salts, and incubating the combined cultures under submerged aerobic conditions, continuing the cultivation until the glucose is consumed, the initial pH of the fermentation being between 5.0 and 6.5 and the temperature in the range 20° to 30° C.

8. A method for the production of carotenoids which comprises cultivating + and − strains of two different species of the genus Blakeslea in a nutrient medium comprising an assimilable carbohydrate source, asparagine as the nitrogen source, a source of thiamin, essential mineral salts, and incubating the combined cultures under submerged aerobic conditions, the initial pH of the fermentation being in the range of 5.0 to 6.5 and the temperature between about 20° and 30° C.

9. A method for the production of carotenoids which comprises cultivating + and — strains of two different species of the genus Blakeslea in a nutrient medium comprising an assimilable carbohydrate, an extract of potatoes as the nitrogen source, a source of thiamin, essential mineral salts, and incubating the combined cultures under submerged aerobic conditions, the initial pH of the fermentation being in the range 5.0 to 6.5 and the temperature between about 20° and 30° C.

References Cited in the file of this patent

Bessey: "Morphology and Taxonomy of Fungi" (1950), pages 183–187.

Difco Manual, 9th ed., 1953, pages 64, 65 and 243.

Barnett et al.: "Science," vol. 123, page 141 (January 1956).